US005943609A

United States Patent [19]

Ericson et al.

[11] Patent Number: 5,943,609

[45] Date of Patent: Aug. 24, 1999

[54] SYSTEM FOR ANTENNA SUPERVISING

[75] Inventors: Lars Ericson, Bromma; Alf Ahlström, Danderyd, both of Sweden

[73] Assignee: Allgon AB, Akersberga, Sweden

[21] Appl. No.: 08/696,945

[22] PCT Filed: Feb. 20, 1995

[86] PCT No.: PCT/SE95/00174

§ 371 Date: Aug. 22, 1996

§ 102(e) Date: Aug. 22, 1996

[87] PCT Pub. No.: WO95/24059

PCT Pub. Date: Sep. 8, 1995

[30] Foreign Application Priority Data

Feb. 23, 1994 [SE] Sweden .............................. 9400627-7

[51] Int. Cl.$^6$ .................................................... H04B 17/00

[52] U.S. Cl. .......................................... 455/67.4; 455/115

[58] Field of Search ................................ 455/67.1, 67.4, 455/67.7, 115, 129, 226.1, 226.4, 9; 324/645, 646, 537

[56] References Cited

U.S. PATENT DOCUMENTS

| | | | |
|---|---|---|---|
| 5,233,537 | 8/1993 | Tietsworth | 364/481 |
| 5,483,680 | 1/1996 | Talbot | 455/129 |
| 5,574,981 | 11/1996 | Ahonen | 455/115 |
| 5,590,415 | 12/1996 | Peltola et al. | 455/115 |

FOREIGN PATENT DOCUMENTS

| | | |
|---|---|---|
| 0479168 | 4/1992 | European Pat. Off. . |
| WO91/15904 | 10/1991 | WIPO . |
| WO92/03744 | 3/1992 | WIPO . |

OTHER PUBLICATIONS

Patent Abstracts of Japan, vol. 10, No. 240, JP, A, 61–70826 (NEC CORP.), Apr. 11, 1986.

Patent Abstracts of Japan, vol. 8, No. 13, JP, A, 58–178645 (Mitsubishi Denki K.K.), Oct. 19, 1983.

*Primary Examiner*—Nguyen Vo
*Attorney, Agent, or Firm*—Jacobson, Price, Holman & Stern, PLLC

[57] ABSTRACT

The invention relates to a system for the supervising of a receiving antenna, the system comprising partly a first sensor for the sensing of an incoming electrical signal from the receiving antenna to the first sensor, a signal processing circuit with an interface, the first sensor being permanently connected between the receiving antenna and receiving circuits and the sensing being carried out at any moment without changing the mutual connection configuration of the receiving antenna and the receiving circuits. The system is provided with a test transmitter connected to the receiving antenna via a coupling circuit and in front of a second sensor, which is permanently connected between the receiving antenna and the receiving circuits, the second sensor being arranged for the sensing of an outgoing electrical signal to the receiving antenna and the signal processing circuit being arranged to deliver, via the interface, an indication of the operability of the receiving antenna based on the sensing.

11 Claims, 1 Drawing Sheet

SYSTEM FOR ANTENNA SUPERVISING

BACKGROUND OF THE INVENTION

1. Field of the Invention

This invention relates to a system for the supervising of receiving antennas said system being intended preferably for a base station in a cellular telephone system.

2. Description of the Related Art

Problems that arise generally today in antenna systems, i.e., one or more antennas including cable arrangements, for base stations in cellular telephone systems include, for instance, the supervising of parameters that describe the performance of the antennas as well as their operability together with other components in the base station. For both transmitting and receiving antennas it is desirable to be able to detect and/or to localize errors originating from, for example,

- connector or cable errors, environmental influence, normal aging or physical damage;
- connection errors or damages in connection with antenna testing;
- changes in the antenna function, caused by physical obstacles to the incoming or outgoing radio wave radiation, e.g., buildings, other structures or vegetation, being added or, possibly, removed in the surroundings of the antenna;
- changes in the antenna function, caused by incoming radiation or other influence from other antennas or antenna systems placed in the surroundings of the antenna.

The characteristics of the antennas or antenna systems that may be influenced according to the above include, e.g., the shape of the coverage area and the transmission quality of the connected calls or the data flows.

Known means for the supervising of receiving antennas in base stations include the connection of measuring instruments for the measuring of, e.g., standing wave ratio or incoming power from the antenna. Through this manual procedure, no effective or systematic supervising of receiving antennas may be achieved whatsoever at reasonable costs.

It is further known to supervise a receiving antenna by connecting a DC voltage to the antenna from the receiving circuits, said antenna usually constituting a short circuit for direct current. The resulting direct current is sensed, giving an indication of whether the galvanic connection between the antenna and the receiving circuits is intact.

Further, in diversity antennas for receiving, as is customary in the receiving circuits, signal levels originating from the different antennas have been sensed and compared. In doing so, it has been possible to establish also antenna errors that give abnormal relations between the signal levels.

Moreover, in a transmitting antenna, which is connected or connectable to transmitting circuits for its transmitting function, sensors for the sensing of outgoing and incoming electrical signals to and from, respectively, the transmitting antenna sensors have been permanently arranged. In doing this, through the measuring of, e.g., transmitted and reflected power, it has been possible to detect errors originating at the transmitter antenna, particularly due to connector or cable errors, environmental influence, normal aging or physical damage.

SUMMARY OF THE INVENTION

The invention is based on the long felt need to supervise a receiving antenna by the sensing of electrical signals to or from the receiving antenna, without breaking for that sake, at the occasion of the sensing, the contact between the receiving antenna and the associated receiving circuits in order to apply a sensor. Through a solution to this problem it would be possible, through the use of, e.g., a microcomputer means, to achieve automatic supervising of the receiving antenna.

The present invention solves the above mentioned problem in the supervising of receiving antennas is solved by a system.

The invention makes it possible to supervise a receiving antenna by the sensing of electrical signals from the receiving antenna, without any need to change physically the connection between the receiving antennas and the associated receiving circuits. Through this solution to the problem, it is possible to achieve automatic supervising of the receiving antenna by means of the signal processing means. An alarm on site and/or via a remote connection may be delivered in case of an error that causes, for a physical quantity or from a quantity derived therefrom, e.g., a sudden change or the exceeding of a predetermined value. Also single or periodic operability reports may be generated in this way.

It is also possible to supervise the receiving antenna by the generation and sensing of electrical signals to the receiving antenna. With this system for supervising of receiving antennas according to the invention, all errors may be detected, which have arisen for the above mentioned reasons. This is achieved mainly according to two measuring principles, namely, through checking the impedance matching in the connections of the receiving antenna and through sensing and evaluating the radiation power incoming to the receiving antenna.

In principle, the system eliminates all operating interruptions that have been formerly unavoidable in the measurements that may be performed by the system according to the invention. In order to be permanently connected each sensor should be substantially free of internal generation of intermodulation products. A so-called directional coupler known per se is suitable for this purpose.

Generally, the sensed level of the signals is a voltage level, which represents (is proportional to) usually some other parameter, preferably the signal power. Possibly, the energy, the current or some other derived quantity may be of interest as well.

In a base station, the first sensor must be prevented from being disturbed by the transmission from a transmitting antenna in the base station. Either the first sensor may be broad band type sensor connected to the receiving antenna via a filter or it could restrict automatically the sensing to narrow, possibly selectable frequency bands. It is advantageous to thus sense the full frequency band of the receiving antenna through repeated sensing in several smaller frequency bands. It is possible to arrange the sensor as one or more radio receivers connected to a directional coupler.

A particularly effective error identification may be achieved by storing measurement data from the sensing of the transmitting and/or receiving antennas in a memory or in graphic form, with possible subsequent statistical processing and/or judging these measurement data for the identification of errors occurring in the operability of the antennas.

As a further development of the invention, it is possible to consider different forms of adaptive sensing of signals flowing to/from the receiving antenna. For example, if the present, incidently radiated signal to the receiving antenna exceeds a predetermined value, at a moment when it is intended to sense a signal reflected in the receiving antenna, such a sensing may be postponed to a later occasion. It could also be possible for the system to register automatically the times of the day, during which the transmitting/receiving activity is low, and to perform the measurements at these times as a first choice.

The system according to the invention may of course be expanded for the supervising of more than one receiving antenna. Supervising of plural transmitting antennas may be performed in combination in a similar manner through an expansion of the system according to the invention.

BRIEF DESCRIPTION OF THE DRAWINGS

An embodiment of the invention is described below with references to the accompanying drawing, wherein.

DETAILED DESCRIPTION OF THE PREFERRED EMBODIMENT

Figure 1:
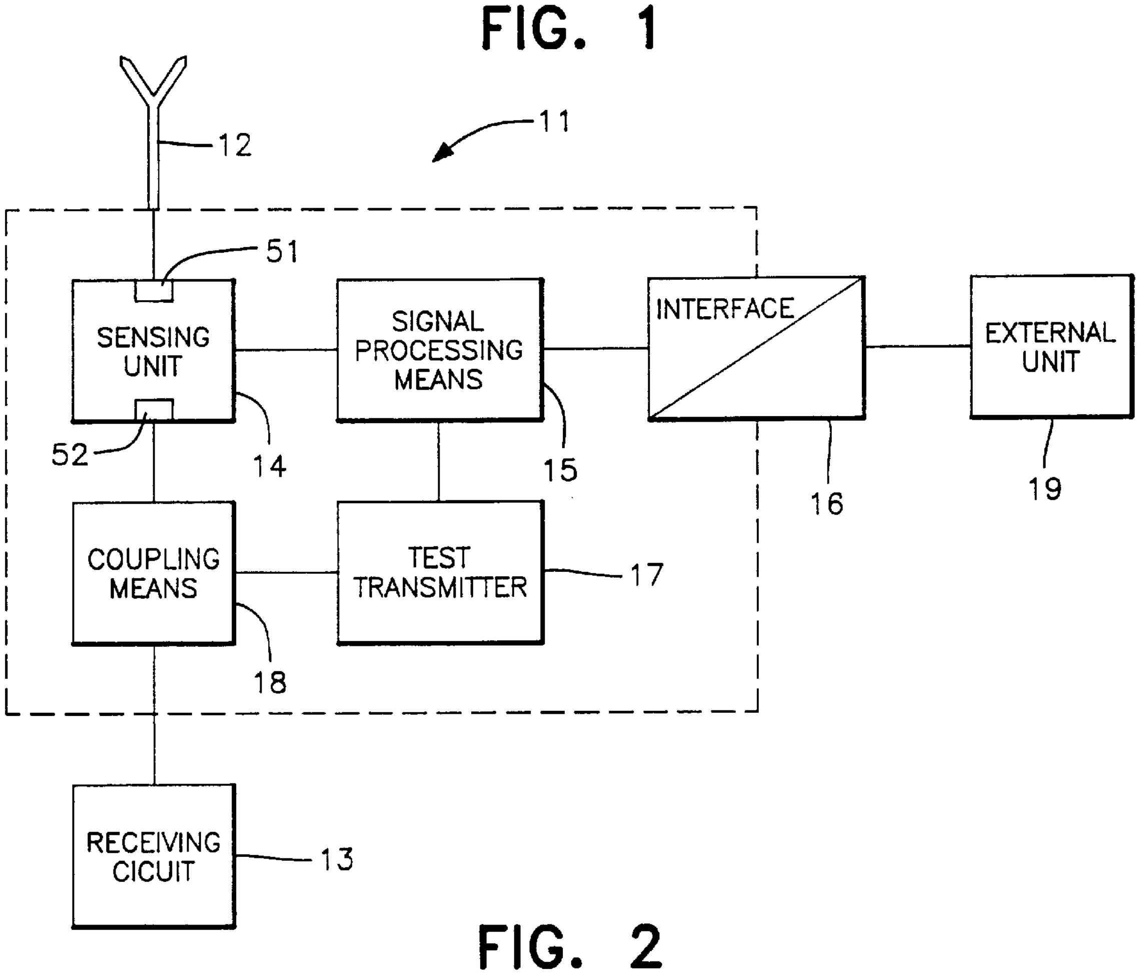
FIG. 1 shows a system for the supervising of receiving antennas according to the invention.

The system 11 of FIG. 1 consists of a sensing unit 14 connected between a receiving antenna 12 and schematically shown receiving circuits 13, said sensing unit 14 including partly a first sensor S1 for the sensing of an incoming electrical signal from the receiving antenna 12, partly a second sensor S2 for the sensing of an outgoing electrical signal to the receiving antenna 12. The first sensor S1 and the second sensor S2 of the change sensing unit 14 are for example in the form of directional couplers, and are coupled to a signal processing means 15 for delivering thereto power values of the incoming and the outgoing electrical signals, measured by the sensors, respectively.

The signal processing means 15 is coupled to a test transmitter 17, which in turn is coupled to the receiving antenna 12 via a coupling means 18, which is connected between the sensor unit 14 and the receiving circuits 13. For the supervising in a first way, the test transmitter 17 transmits radio frequency signals during predetermined times, simultaneously with the delivery, to the signal processing means 15 from the first and the second sensors S1, S2, respectively, of corresponding power values of the incoming/reflected and the outgoing signal, respectively. In performing this, the test transmitter 17 is controlled by the signal processing means 15 regarding transmission frequency, duration, and time.

The signal processing means 15 is also coupled to an interface 16 for the transmission of an indication, possibly in the form of an alarm, based on the sensed power values. The interface 16 may be constituted by a means for visual or audible presentation of the indication. Also, it could be constituted by a coupling to data communication link for transmission of the indication. Interface 16 may also be connected to an external unit 19 for carrying out data communication for the purpose of influencing the operability of the system and/or reading the result of the sensing stored in the memory of the signal processing means.

Figure 2:
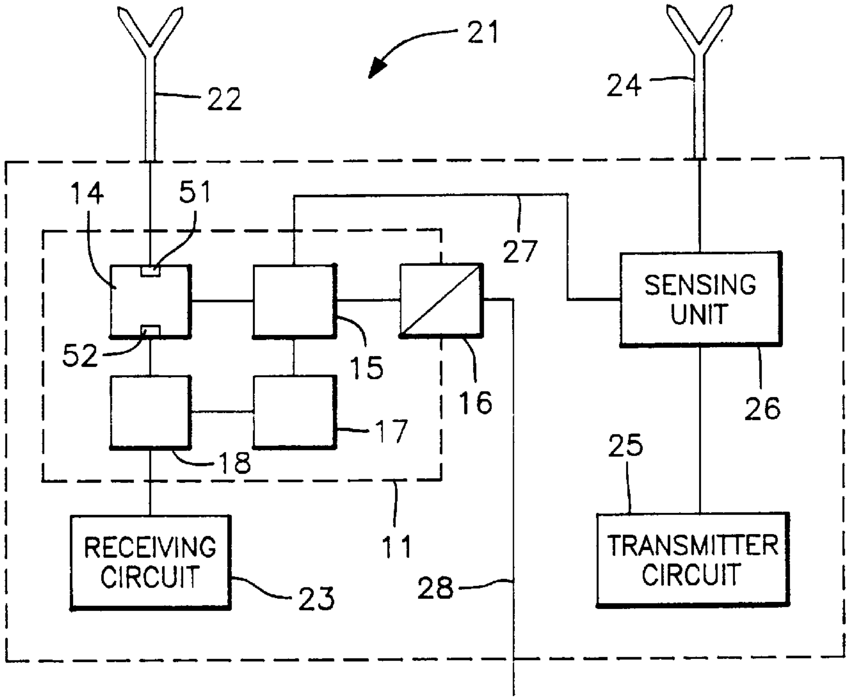
FIG. 2 shows schematically a base station in a cellular telephone system provided with the system shown in FIG. 1.
Figure 1:
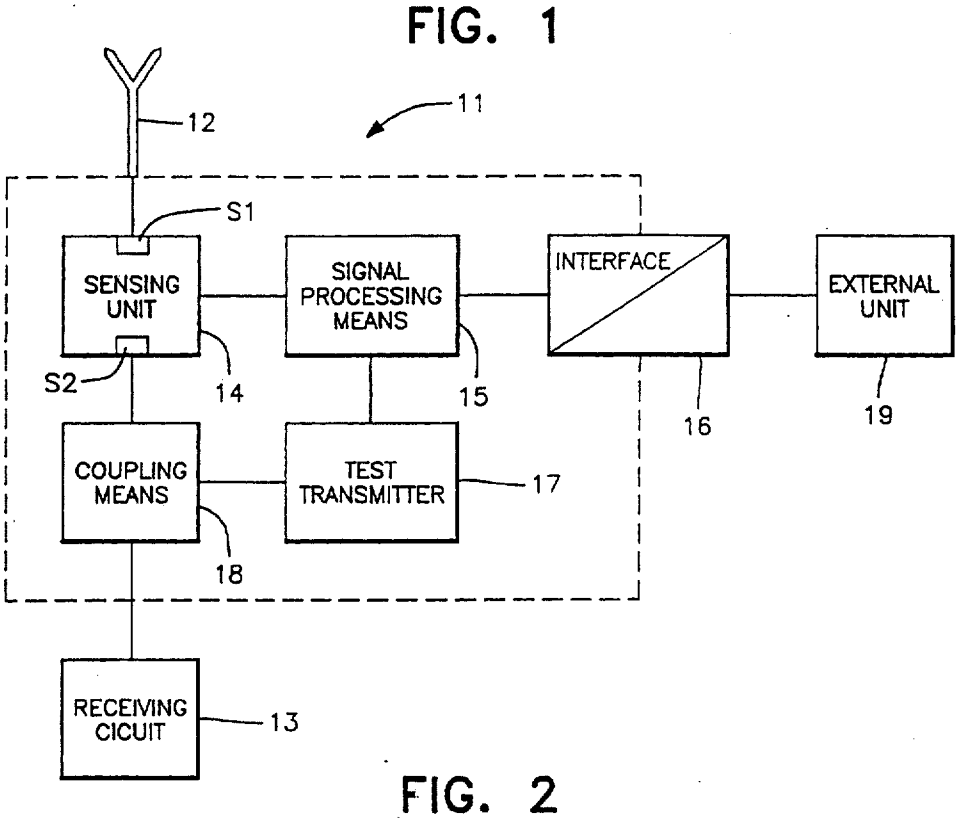
Figure 2:
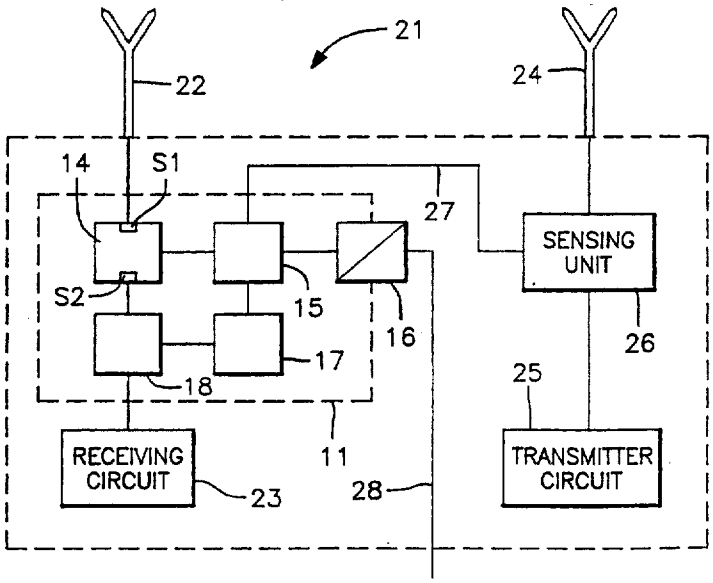

The base station 21 shown simplified in FIG. 2 includes a system 11 (identical to the system 11 of FIG. 1) for the supervising of a receiving antenna 22 included in a base station. Further, the base station 21 includes receiving circuits 23, to which the receiving antenna 22 is connected via the system 11. Moreover, a transmitting antenna 24 is included in the base station as well as schematically shown transmitter circuits 25 and a sensing unit 26 connected between these, said sensing unit 26 at least including a third sensor S3 for the sensing of outgoing electrical signals to the transmitting antenna. The third sensor S3 may be arranged to sense also incoming signals from the transmitting antenna 24.

Normally, in the base station 21 some feedback is occurring through the air of the signal from its own transmitting antenna to its own receiving antenna. Assuming that this normal feedback is substantially known, the following occurs. The power values of the outgoing signals to the transmitting antenna are fed via a link 27 to the signal processing means 15 (FIG. 1) of the system 11, whereat supervising is achieved in a second way through the simultaneous delivery, to the signal processing means 15 (FIG. 1) from the first sensor S1, of power values of the incoming signal from the receiving antenna. At this moment, the test transmitter 17 (FIG. 1) and the second sensor S2 are inactive. Similarly to the above, an indication based also on the thus sensed power values may be transmitted from the signal processing means 15 (FIG. 1) via the interface 16 (FIG. 1) and a link 28.

We claim:

1. A system for the supervision of a receiving antenna coupled to receiving circuits, said system comprising:

a test transmitter and a coupling means, the test transmitter being connected to the coupling means and arranged for generating an outgoing electrical signal to the receiving antenna, said test transmitter further being connected to the receiving antenna via the coupling means such that the power transmitted from it does not damage the receiving circuits or disturb reception, a first sensor, permanently connected between the receiving antenna and the receiving circuits, for sensing an incoming electrical signal from the receiving antenna to the receiving circuits, a second sensor, permanently connected between the receiving antenna and the coupling means, for sensing the outgoing electrical signal from the test transmitter to the receiving antenna, said coupling means being connected between the second sensor and the receiving circuits, a signal processing means connected to the first and the second sensors, respectively, with an interface, said signal processing means being arranged to allow the delivery, via said interface, of indications of the operability of the receiving antenna based on the sensing in the first and the second sensors, respectively.

2. The system according to claim 1, further comprising a third sensor coupled via a link to the signal processing means and arranged to sense an outgoing signal to a transmitting antenna, part of the radiation of which is fed back to the receiving antenna, which part is assumed to be known, said signal processing means, through its coupling to said first sensor, being arranged to allow the delivery, via said interface, of indications of the operability of the receiving antenna based on this sensing as well.

3. The system according to claim 1, wherein the sensing is restricted to selectable frequency bands distributed over the frequency band of the receiving antenna.

4. The system according to claim 1, wherein the first and the second sensors, respectively, are arranged to sense the level of the incoming and the outgoing electrical signals, respectively.

5. The system according to claim 4, wherein the test transmitter is active on command or at predetermined moments, said second and first sensors, respectively, then sensing the level of the outgoing and the reflected, incoming electrical signals, respectively, said signal processing means receiving values corresponding to the respective level.

6. The system according to claim 5, wherein an alarm signal is delivered via the interface of the signal processing means in case the ratio of a level of the incoming signal and a level of the outgoing signal of the receiving antenna exceeds a predetermined value.

7. The system according to claim 1, wherein the signal processing means senses, by means of the first and the second sensors, respectively, the incoming and the outgoing electrical signals, respectively, with predetermined intervals or at predetermined times.

8. The system according to claim 1, wherein the signal processing means comprises memory circuits for storing the result of the sensing.

9. The system according to claim 8, wherein an external unit may be connected to the interface for carrying out data communication for the purpose of influencing the operability of the system and/or reading the result of the sensing stored in the memory of the signal processing means.

10. The system according to claim 1, wherein the first and the second sensors, respectively, are constituted by directional couplers, adapted for the sensing of the incoming and outgoing electrical signals from and to the receiving antenna, respectively.

11. A system for the supervision of a receiving antenna coupled to receiving circuits, said system comprising:

a test transmitter and a coupling means, the test transmitter being connected to the coupling means and arranged for generating an outgoing electrical signal to the receiving antenna, said coupling means substantially not coupling any signal in the direction of the receiving circuits, a first sensor, permanently connected between the receiving antenna and the receiving circuits, for sensing of an incoming electrical signal from the receiving antenna to the receiving circuits;

a second sensor permanently connected between the receiving antenna and the coupling means, for sensing the outgoing electrical signal from the test transmitter to the receiving antenna, said coupling means being permanently connected between the second sensor and the receiving circuits, a signal processing means connected to the first and the second sensors, respectively, with an interface, said signal processing means being arranged to allow the delivery, via said interface, of indications of the operability of the receiving antenna based on the sensing in the first and the second sensors, respectively.

* * * * *

UNITED STATES PATENT AND TRADEMARK OFFICE
CERTIFICATE OF CORRECTION

PATENT NO. : 5,943,609 Page 1 of 3

DATED : August 24, 1999

INVENTOR(S) : Lars ERICSON et al

It is certified that error appears in the above-identified patent and that said Letters Patent is hereby corrected as shown below:

The drawing sheet, consisting of Figs. 1 and 2, should be deleted to be replaced with the drawing sheet, consisting of Figs. 1 and 2, as shown on the attached page.

The title page should be deleted to appear as per attached title page:

Signed and Sealed this

Eighteenth Day of July, 2000

*Attest:*

Q. TODD DICKINSON

*Attesting Officer* *Director of Patents and Trademarks*

United States Patent [19]

Ericson et al.

[11] Patent Number: 5,943,609

[45] Date of Patent: Aug. 24, 1999

[54] SYSTEM FOR ANTENNA SUPERVISING

[75] Inventors: Lars Ericson, Bromma; Alf Ahlström, Danderyd, both of Sweden

[73] Assignee: Allgon AB, Akersberga, Sweden

[21] Appl. No.: 08/696,945

[22] PCT Filed: Feb. 20, 1995

[86] PCT No.: PCT/SE95/00174

§ 371 Date: Aug. 22, 1996

§ 102(e) Date: Aug. 22, 1996

[87] PCT Pub. No.: WO95/24059

PCT Pub. Date: Sep. 8, 1995

[30] Foreign Application Priority Data

Feb. 23, 1994 [SE] Sweden .............................. 9400627-7

[51] Int. Cl.[6] .............................................. H04B 17/00

[52] U.S. Cl. .......................................... 455/67.4; 455/115

[58] Field of Search ............................... 455/67.1, 67.4, 455/67.7, 115, 129, 226.1, 226.4, 9; 324/645, 646, 537

[56] References Cited

U.S. PATENT DOCUMENTS 5,233,537 8/1993 Tietsworth .............................. 364/481
5,483,680 1/1996 Talbot .................................... 455/129
5,574,981 11/1996 Ahonen .................................. 455/115
5,590,415 12/1996 Peltola et al. .......................... 455/115

FOREIGN PATENT DOCUMENTS 0479168 4/1992 European Pat. Off. .
WO91/15904 10/1991 WIPO .
WO92/03744 3/1992 WIPO .

OTHER PUBLICATIONS

Patent Abstracts of Japan, vol. 10, No. 240, JP, A, 61-70826 (NEC CORP.), Apr. 11, 1986.

Patent Abstracts of Japan, vol. 8, No. 13, JP, A, 58-178645 (Mitsubishi Denki K.K.), Oct. 19, 1983.

*Primary Examiner*—Nguyen Vo
*Attorney, Agent, or Firm*—Jacobson, Price, Holman & Stern, PLLC

[57] ABSTRACT

The invention relates to a system for the supervising of a receiving antenna, the system comprising partly a first sensor for the sensing of an incoming electrical signal from the receiving antenna to the first sensor, a signal processing circuit with an interface, the first sensor being permanently connected between the receiving antenna and receiving circuits and the sensing being carried out at any moment without changing the mutual connection configuration of the receiving antenna and the receiving circuits. The system is provided with a test transmitter connected to the receiving antenna via a coupling circuit and in front of a second sensor, which is permanently connected between the receiving antenna and the receiving circuits, the second sensor being arranged for the sensing of an outgoing electrical signal to the receiving antenna and the signal processing circuit being arranged to deliver, via the interface, an indication of the operability of the receiving antenna based on the sensing.

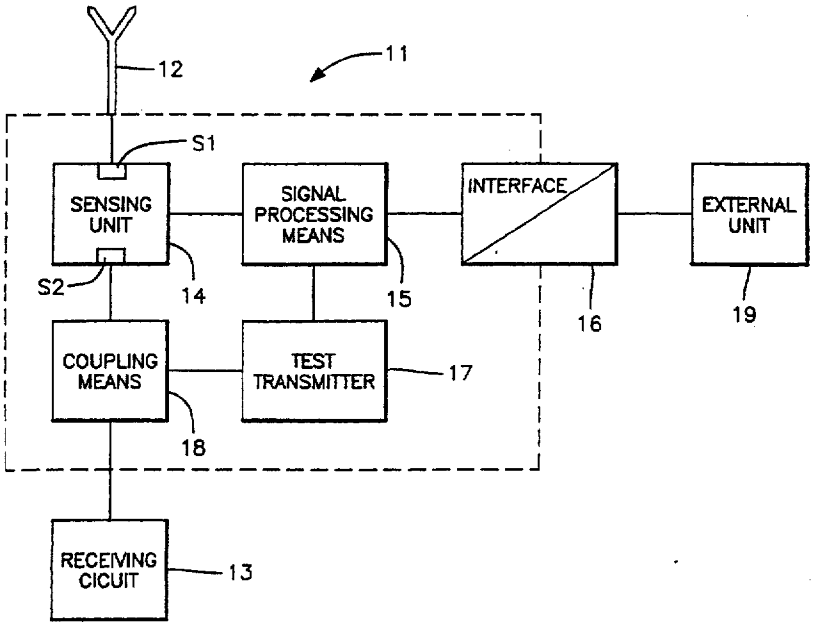

11 Claims, 1 Drawing Sheet